United States Patent [19]
Shipley

[11] 4,269,733
[45] May 26, 1981

[54] ULTRA HIGH EFFICIENCY CATALYST FOR POLYMERIZING OLEFINS

[75] Inventor: Randall S. Shipley, Alvin, Tex.

[73] Assignee: The Dow Chemical Company, Midland, Mich.

[21] Appl. No.: 79,773

[22] Filed: Sep. 28, 1979

[51] Int. Cl.³ .................... C08F 4/64; C08F 4/68; C08F 4/62

[52] U.S. Cl. .................... 252/429 C; 252/429 B; 252/431 R; 526/125

[58] Field of Search ........... 252/431 R, 429 A, 429 B, 252/429 C

[56] References Cited

U.S. PATENT DOCUMENTS

| | | | |
|---|---|---|---|
| 3,066,126 | 11/1962 | Porter et al. | 252/429 X |
| 3,068,180 | 12/1962 | van Amerongen et al. | 252/429 |
| 3,070,549 | 12/1962 | Ziegler et al. | 252/429 A |
| 3,207,741 | 9/1965 | Schafer et al. | 252/429 X |
| 3,215,682 | 11/1965 | Farrar et al. | 252/429 X |
| 3,257,332 | 6/1966 | Ziegler et al. | 252/429 |
| 3,458,493 | 7/1969 | Gaeth et al. | 252/429 X |
| 3,489,731 | 1/1970 | Imoto et al. | 252/431 X |
| 3,520,826 | 7/1970 | Tanaka et al. | 252/429 |
| 3,678,025 | 7/1972 | Birrell | 252/429 X |
| 3,681,317 | 8/1972 | Pioll et al. | 252/431 X |
| 3,687,910 | 8/1972 | Jones | 252/431 X |
| 3,728,283 | 4/1973 | Chauvin et al. | 252/429 |
| 3,732,198 | 5/1973 | Whiteley et al. | |
| 3,738,944 | 6/1973 | Candlin et al. | 252/431 |
| 3,740,384 | 6/1973 | Ballard et al. | 252/431 X |
| 3,840,508 | 10/1974 | Ballard et al. | 252/431 X |
| 3,932,307 | 1/1976 | Setterquist | 252/431 X |
| 3,959,239 | 5/1976 | Butter et al. | 526/25 |
| 3,989,878 | 11/1976 | Aishima et al. | 252/431 X |
| 4,006,101 | 2/1977 | Matsuura et al. | 252/429 |
| 4,011,383 | 3/1977 | Setterquist | 526/154 |
| 4,017,525 | 4/1977 | Setterquist | 252/431 X |
| 4,018,707 | 4/1977 | Wyatt | 252/431 X |
| 4,067,822 | 1/1978 | Gessell et al. | 252/429 |
| 4,091,082 | 5/1978 | Gessell et al. | 252/429 X |
| 4,104,198 | 8/1978 | May et al. | 252/429 |
| 4,109,071 | 8/1978 | Berger et al. | 252/429 X |
| 4,120,820 | 10/1978 | Birkelbach | 252/429 |
| 4,163,831 | 8/1979 | Gessell | 252/431 X |
| 4,172,050 | 10/1979 | Gessell | 252/431 |

FOREIGN PATENT DOCUMENTS 49-14348 4/1974 Japan.
1492379 11/1977 United Kingdom.
1493159 11/1977 United Kingdom.
1500873 2/1978 United Kingdom.

OTHER PUBLICATIONS

Petkov et al., "Organometallics in Ethylene Polymerization with a Catalyst System," Polymer, vol. 19, May 1978, pp. 567–569.

*Primary Examiner*—Patrick Garvin
*Attorney, Agent, or Firm*—J. G. Carter

[57] ABSTRACT

Compositions consisting of the reaction product or complex resulting from the mixing of a transition metal compound such as a tetraalkoxy titanium compound and a zinc compound such as a dialkyl zinc compound are useful in the preparation of catalysts for polymerizing α-olefins at ultra-high efficiencies at high polymerization temperatures.

9 Claims, No Drawings

ULTRA HIGH EFFICIENCY CATALYST FOR POLYMERIZING OLEFINS

BACKGROUND OF THE INVENTION

This invention relates to precursors for and to new catalyst compositions useful for initiating and promoting polymerization of α-olefins and to a polymerization process employing such catalyst compositions.

It is well known that olefins such as ethylene, propylene and 1-butene in the presence of metallic catalysts, particularly the reaction products of organometallic compounds and transition metal compounds, can be polymerized to form substantially unbranched polymers of relatively high molecular weight. Typically such polymerizations are carried out at relatively low temperatures and pressures.

Among the methods of producing such linear olefin polymers, some of the most widely utilized are those described by Professor Karl Ziegler in U.S. Pat. Nos. 3,113,115 and 3,257,332. In these methods, the catalyst employed is obtained by admixing a compound of a transition metal of Groups IVB, VB, VIB and VIII of Mendeleev's Periodic Table of Elements with an organometallic compound. Generally, the halides, oxyhalides and alkoxides or esters of titanium, vanadium and zirconium are the most widely used transition metal compounds. Common examples of the organometallic compounds include the hydrides, alkyls and haloalkyls of aluminum, alkylaluminum halides, Grignard reagents, alkali metal aluminum hydrides, alkali metal borohydrides, alkali metal hydrides, alkaline earth metal hydrides and the like. Usually, polymerization is carried out in a reaction medium comprising an inert organic liquid, e.g. an aliphatic hydrocarbon, and the aforementioned catalyst. One or more olefins may be brought into contact with the reaction medium in any suitable manner. A molecular weight regulator, which is normally hydrogen, is usually present in the reaction vessel in order to suppress the formation of undesirable high molecular weight polymers.

Following polymerization, it is common to remove catalyst residues from the polymer by repeatedly treating the polymer with alcohol or other deactivating agent such as aqueous base. Such catalyst deactivation and/or removal procedures are expensive both in time and material consumed as well as the equipment required to carry out such treatment.

Furthermore, most of the afornentioned known catalyst systems are more efficient in preparing polyolefins in slurry (i.e., wherein the polymer is not dissolved in the carrier) than in solution (i.e., wherein the temperature is high enough to solubilize the polymer in the carrier). The lower efficiencies of such catalysts in solution polymerization is believed to be caused by the general tendency of such catalysts to become rapidly depleted or deactivated by significantly higher temperatures that are normally employed in solution processes. In addition, processes involving the copolymerization of ethylene with higher α-olefins exhibit catalyst efficiencies significantly lower than ethylene homopolymerization processes.

Recently, catalysts having higher efficiencies have been disclosed, e.g., U.S. Pat. Nos. 3,392,159, 3,737,393, West German Patent Application No. 2,231,982 and British Pat. Nos. 1,305,610 and 1,358,437. While the increased efficiencies achieved by using these recent catalysts are significant, even higher efficiencies are desirable, particularly in copolymerization processes.

Even more recently, e.g. British Pat. No. 1,492,379, high efficiency catalysts have been employed which permit polymerization temperatures above 140° C. Such high polymerization temperatures provide for reduced energy requirements in solution polymerization processes in that the closer the polymerization temperature is to the boiling point of the polymerization solvent, the less energy that is required in removing the solvent.

The present invention provides for catalysts having higher efficiencies at these temperatures or higher polymerization temperatures at comparable efficiencies.

SUMMARY OF THE INVENTION

The present invention in one aspect is a transition metal compound suitable for use in the preparation of olefin polymerization catalysts which is the reaction product or complex formed by mixing at a temperature and for a time sufficient to provide a color change (a) a transition metal compound having at least one hydrocarbyloxy group attached to said transition metal and (b) a zinc compound;

wherein the atomic ratio of Zn to transition metal (Tm) is at least about 0.03:1, preferably from about 0.12:1 to about 5:1 and most preferably from about 0.25:1 to about 2:1. Higher Zn:Tm ratios can be employed; however, no particular advantage is observed and the higher levels increase the cost of catalysts produced therefrom.

Another aspect of the present invention are catalysts for polymerizing α-olefins which comprise the catalytic reaction product of (A) the aforementioned reaction product or complex;

(B) a magnesium halide resulting from the reaction of (a) an organomagnesium component and (b) a halide source; and (c) an organoaluminum compound, if required.

The components are employed in quantities which provide the composition with atomic ratios of the elements as follows:

Mg:Tm is from about 1:1 to about 2000:1, preferably from about 2:1 to about 200:1, most preferably from about 5:1 to about 75:1.

Al:Tm is from about 0.1 to about 2000:1, preferably from about 0.5:1 to about 200:1 and most preferably from about 1:1 to about 75:1.

Excess X:Al is from about 0.0005:1 to about 10:1, preferably from about 0.002:1 to about 2:1 and most preferably from about 0.01:1 to about 1.4:1.

Excess X is the amount of halide above that amount which is theoretically required to convert the organomagnesium component to magnesium dihalide.

DETAILED DESCRIPTION OF THE PREFERRED EMBODIMENTS

The present invention is most advantageously practiced in a polymerization process wherein an α-olefin is polymerized, generally in the presence of hydrogen as a molecular weight control agent, in a polymerization zone containing an inert diluent and the catalytic reaction product as hereinbefore described. Especially advantageous is the copolymerization of ethylene and higher α-olefins using the catalytic reaction product of this invention. The foregoing polymerization process is most beneficially carried out under inert atmosphere and relatively low temperature and pressure, although very high pressures are optionally employed.

Olefins which are suitably homopolymerized or copolymerized in the practice of this invention are generally the aliphatic α-monoolefins or α-diolefins having from 2 to 18 carbon atoms. Illustratively, such α-olefins can include ethylene, propylene, butene-1, pentene-1, 3-methylbutene-1, 4-methylpentene-1, hexene-1, octene-1, dodecene-1, octadecene-1, 1,7-octadiene, mixtures thereof and the like. It is understood that α-olefins may be copolymerized with other α-olefins and/or with small amounts, i.e. up to about 25 weight percent based on the polymer, of other ethylenically unsaturated monomers such as styrene, α-methylstyrene and similar ethylenically unsaturated monomers which do not destroy conventional Ziegler catalysts. Most benefits are realized in the polymerization of aliphatic α-monoolefins, particularly ethylene and mixtures of ethylene and up to 50, especially from about 0.1 to about 40 weight percent, of propylene, butene-1, hexene-1, octene-1, 4-methylpentene-1, 1,7-octadiene or similar α-olefin or diolefin based on total monomer.

Suitable zinc compounds which can be advantageously employed are those represented by the formulae $R_2Zn$ or $RZnX$ wherein each R is independently a hydrocarbyl group having from 1 to about 20, preferably from 1 to about 10, carbon atoms and X is a halogen, preferably chlorine or bromine. Particularly suitable zinc compounds include, for example, diethyl zinc, diphenyl zinc, ethyl zinc chloride, mixtures thereof and the like.

Suitable transition metal compounds which can be employed in the present invention include those represented by the formulae $Tm(OR)_y X_{x-y}$ and $Tm(OR)_{x-2}0$ wherein Tm is a transition metal selected from groups IVB, VB or VIB; each R is independently a hydrocarbyl group, preferably alkyl or arly, having from 1 to about 20, preferably from 1 to about 10, carbon atoms; each X is independently a halogen, preferably chlorine or bromine; x has a value equal to the valence of Tm and y has a value from 1 to the valence of Tm.

Particularly suitable transition metal compounds include for example tetraethoxy titanium, tetraisopropoxy titanium, tetra-n-butoxy titanium, di-n-butoxy titanium dichloride, tetraphenoxy titanium, tetra-n-propoxy titanium, tetra-(2-ethylhexoxy) titanium, tri-n-butyoxy vanadium oxide, tri-isopropoxy vanadium oxide, zirconium tetra-n-butoxide, zirconium tetra-n-propoxide, zirconium tetra-isopropoxide, mixtures thereof and the like.

Suitable organomagnesium components which can be employed in the present invention include those represented by the formula $MgR''_2 \cdot xMR''_y$ wherein each R'' is independently hydrocarbyl or hydrocarbyloxy, M is aluminum, zinc or mixtures thereof and x is about zero to about 10, preferably 0.001 to about 5, most preferably from about 0.15 to about 2.5 and y denotes the number of hydrocarbyl and/or hydrocarbyloxy groups which corresponds to the valence of M. As used herein, hydrocarbyl and hydrocarbyloxy are monovalent hydrocarbon radicals. Preferably, hydrocarbyl is alkyl, cycloalkyl, aryl, aralkyl, alkenyl and similar hydrocarbon radicals having 1 to 20 carbon atoms, with alkyl having 1 to 10 carbon atoms being especially preferred. Likewise, preferably, hydrocarbyloxy is alkoxy, cycloalkyloxy, aryloxy, aralkyloxy, alkenyloxy and similar oxyhydrocarbon radicals having 1 to 20 carbon atoms, with alkyloxy having 1 to 10 carbon atoms is preferred. Hydrocarbyl is preferred over hydrocarbyloxy.

Preferably the organomagnesium compound is a hydrocarbon soluble dihydrocarbylmagnesium such as the magnesium dialkyls and the magnesium diaryls. Exemplary suitable magnesium dialkyls include particularly n-butyl-sec-butyl magnesium, diiospropyl magnesium, di-n-hexyl magnesium, isopropyl-n-butyl magnesium, ethyl-n-hexyl magnesium, ethyl-n-butyl magesium, di-n-octyl magnesium and others wherein the alkyl has from 1 to 20 carbon atoms. Exemplary suitable magnesium diaryls include diphenylmagnesium, dibenzylmagnesium, and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides and metallic halides.

Suitable non-metallic halides are represented by the formula $R'X$ wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl choride, t-amyl bromide, allyl chloride, benzyl chloride, crotyl chloride, methylvinyl carbinyl chloride, α-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein M is a metal of Groups IIB, IIIA or IVA, of Mendeleev's Periodic Table of Elements, R is a monovalent organic radical, X is a halogen, Y has a value corresponding to the valence of M and a has a value from 1 to y. Preferred metallic halides are aluminum halides of the formula $AlR_{3-a}X_a$ wherein each R is independently hydrocarbyl as hereinbefore defined such as alkyl, X is a halogen and a is a number from 1 to 3. Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R'', and the organic moieties of the halide source, e.g., R and R', are suitably any other organic radical provided that they do not contain functional groups that poison conventional Ziegler catalysts. Preferably such organic moieties do not contain active hydrogen, i.e., those sufficiently active to react with the Zerewitinoff reagent.

In preparing the reaction product or complex of the present invention from said zinc compounds and said transition metal compounds, the two components are simply mixed together in a suitable solvent at any suitable temperature, usually from about $-50°$ C. to $100°$ C., preferably from about $0°$ C. to about $30°$ C., for a time sufficient to cause a color change in the reaction mixture. At lower temperatures longer times are required.

The reaction time is also affected by the concentration of the reactants, e.g. low concentrations require longer times at any given temperature than do higher concentrations. The solvents which can be employed include those suitable for preparing the catalysts of this invention with the hydrocarbon solvents being most suitable.

The color change varies depending upon the particular components employed.

The magnesium halide can be preformed from the organomagnesium compound and the halide source or it can be prepared in situ in which instance the catalyst is prepared by mixing in a suitable solvent (1) the organomagnesium component; (2) the halide source and (3) the reaction product or complex formed by mixing (a) said transition metal compound and (b) said zinc compound.

The foregoing catalyst components are combined in proportions sufficient to provide atomic ratios as previously mentioned.

In cases wherein neither the organomagnesium component nor the halide source contains aluminum or contains an insufficient quantity of aluminum, it is necessary to include in the total catalyst an aluminum compound such as an alkyl aluminum compound, e.g., a trialkyl aluminum, an alkyl aluminum halide or an aluminum halide. If polymerization temperatures below $180°$ C. are employed, the atomic ratios of Al:Ti may be from about 0.1:1 to about 2000:1, preferably from 1:1 to about 200:1. However, when polymerization temperatures above $180°$ C. are employed, the aluminum compound is used in proportions such that the Mg:Al ratio is more than 0.3:1, preferably from 0.5:1 to 10:1, and Al:Ti ratio is less than 120:1, preferably less than 50:1. It is understood, however, that the use of very low amounts of aluminum necessitates the use of high purity solvents or diluents in the polymerization zone. Further, other components present in the zone should be essentially free of impurities which react with aluminum alkyls. Otherwise, additional quantities of an organometallic compound as previously described, preferably an organoaluminum compound, must be used to react with such impurities. Moreover, it is understood that in the catalyst the aluminum compound should be in the form of trialkyl aluminum or alkyl aluminum halide provided that the alkyl aluminum halide be substantially free of alkyl aluminum dihalide. In the above mentioned aluminum compounds, the alkyl groups independently have from 1 to about 20, preferably from 1 to about 10 carbon atoms.

When additional quantities of aluminum compound are employed, it can be added to the aforementioned catalyst during the preparation thereof or the aluminum deficient catalyst can be mixed with the appropriate aluminum compound prior to entry into the polymerization reactor or, alternatively, the aluminum deficient catalyst and the aluminum compound can be added to the polymerization reactor as separate streams or additions.

The foregoing catalytic reaction is preferably carried out in the presence of an inert diluent. The concentrations of catalyst components are preferably such that when the essential components of the catalytic reaction product are combined, the resultant slurry is from about 0.005 to about 1.0 molar (moles/liter) with respect to magnesium. By way of an example of suitable inert organic diluents can be mentioned liquified ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when free of any olefin compounds and other impurities, and especially those having boiling points in the range from about $-50°$ to about $200°$ C. Also included as suitable inert diluents are benzene, toluene, ethylbenzene, cumene, decalin and the like.

Mixing of the catalyst components to provide the desired catalytic reaction product is advantageously carried out under an inert atmosphere such as nitrogen, argon or other inert gas at temperatures in the range from about $-100$ to about $200°$ C., preferably from about $0°$ to about $100°$ C. The period of mixing is not considered to be critical as it is found that a sufficient catalyst composition most often occurs within about 1 minute or less. In the preparation of the catalytic reaction product, it is not necessary to separate hydrocarbon soluble components from hydrocarbon insoluble components of the reaction product.

In order to maximize catalyst efficiency, the catalyst is prepared by mixing the components of the catalyst in an inert liquid diluent in the following especially preferred order: organomagnesium compound, halide source, the aluminum compound if required, and the reaction product or complex transition metal compound and zinc compound.

In the polymerization process employing the aforementioned catalytic reaction product, polymerization is effected by adding a catalytic amount of the above catalyst composition to a polymerization zone containing α-olefin monomer, or vice versa. The polymerization zone is maintained at temperatures in the range from about $0°$ to about $300°$ C., preferably at solution polymerization temperatures, e.g., from about $130°$ to about $250°$ C., for a residence time of about a few seconds to several days, preferably 15 seconds to 2 hours. It is generally desirable to carry out the polymerization in the absence of moisture and oxygen and a catalytic amount of the catalytic reaction product is generally within the range from about 0.0001 to about 0.1 millimoles titanium per liter of diluent. It is understood, however, that the most advantageous catalyst concentration will depend upon polymerization conditions such as temperature, pressure, solvent and presence of catalyst poisons and that the foregoing range is given to obtain maximum catalyst yields in weight of polymer per unit weight of titanium. Generally, in the polymerization process, a carrier which may be an inert organic diluent or solvent or excess monomer is employed. In order to realize the full benefit of the high efficiency catalyst of the present invention, care must be taken to avoid oversaturation of the solvent with polymer. If such saturation occurs before the catalyst becomes depleted, and full efficiency of the catalyst is not realized. For best results, it is preferred that the amount of polymer in the carrier not exceed about 50 weight percent based on the total weight of the reaction mixture.

It is understood that inert diluents employed in the polymerization recipe are suitably as defined hereinbefore.

The polymerization pressures preferably employed are relatively low, e.g., from about 50 to about 100 psig, especially from about 100 to about 700 psig. However, polymerization within the scope of the present invention can occur at pressures from atmospheric up to pressures determined by the capabilities of the polymerization equipment. During polymerization it is desirable to stir the polymerization recipe to obtain better temperature control and to maintain uniform polymerization mixtures througout the polymerization zone.

In order to optimize catalyst yields in the polymerization of ethylene, it is preferable to maintain an ethylene concentration in the solvent in the range of from about 1 to about 10 weight percent, most advantageously from about 1.2 to about 2 weight percent. To achieve this, when an excess of ethylene is fed into the system, a portion of the ethylene can be vented.

Hydrogen can be employed in the practice of this invention to control the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalytic reaction product in any conventional manner, preferably by bringing the catalytic reaction product and monomer together with intimate agitation provided by suitable stirring or other means. Agitation can be continued during polymerization, or in some instances, the polymerization can be allowed to remain unstirred while the polymerization takes place. In the case of more rapid reactions with more active catalysts, means can be provided for refluxing monomer and solvent, if any of the latter is present, in order to remove the heat of reaction. In any event, adequate means should be provided for dissipating the exothermic heat of polymerization. If desired, the monomer can be brought in the vapor phase into contact with the catalytic reaction product, in the presence or absence of liquid material. The polymerization can be effected in the batch manner, or in a continuous manner, such as, for example, by passing the reaction mixture through an elongated reaction tube which is contacted externally with suitable cooling media to maintain the desired reaction temperature, or by passing the reaction mixture through an equilibrium overflow reactor or a series of the same.

The polymer is readily recovered from the polymerization mixture by driving off unreacted monomer and solvent if any is employed. No further removal of impurities is required. Thus, a significant advantage of the present invention is the elimination of the catalyst residue removal steps. In some instances, however, it may be desirable to add a small amount of a catalyst deactivating reagent of the types conventionally employed for deactivating Ziegler catalysts. The resultant polymer is found to contain insignificant amounts of catalyst residue and to possess a relatively narrow molecular weight distribution.

The following examples are given to illustrate the invention, and should not be construed as limiting its scope. All percentages are by weight and all parts are by molar or atomic ratio unless otherwise indicated.

In the following examples, the melt index values $I_2$ and $I_{10}$ were determined by ASTM D 1238-70 and the density values were determined by ASTM D 1248.

EXAMPLES 1–5

A. Preparation of the diethyl zinc-titanium complexes

A stock solution (0.025 M) of titanium tetraethoxide (Ti(OEt)$_4$), titanium tetra-n-propoxide (Ti(OnPr)$_4$), titanium tetra-isopropoxide (Ti(OiPr)$_4$), titanium tetra-n-butoxide (Ti(OnBu)$_4$), and titanium tetra-(2-ethylhexoxide) (Ti(OEH)$_4$) was prepared by mixing the amount of neat solution indicated in Table I with sufficient Isopar ® E (an isoparaffinic hydrocarbon fraction having a boiling range of 116°–134° C.) to bring the total volume to 100.0 ml. After the solution was well mixed, 10.0 ml of the solution was transferred to a small vial where it was mixed with 10.0 ml of 0.025 M diethyl zinc (DEZ) prepared by diluting 2.84 ml of 0.88 M DEZ to 100 ml using Isopar ® E. The final titanium and DEZ concentrations were 0.0125 M. These solutions developed characteristic colors as indicated in Table II. The solutions were stored in amber bottles to prevent photodecomposition of the complex.

TABLE I

| Amount of Titanium Species Needed for a 0.025 M Stock Solution | |
|---|---|
| Titanium Component | ml Neat Solution Needed |
| Ti(OEt)$_4$ | 0.52 |
| Ti(OnPr)$_4$ | 0.74 |
| Ti(OiPr)$_4$ | 0.74 |
| Ti(OnBu)$_4$ | 0.86 |
| Ti(OEH)$_4$ | 1.52 |

TABLE II

| | Characteristic Colors of Diethyl Zinc-Titanium Complexes | | | | |
|---|---|---|---|---|---|
| Time After Mixing | Titanium Compound | | | | |
| | Ti(OEt)$_4$ | Ti(OnPr)$_4$ | Ti(OiPr)$_4$ | Ti(OnBu)$_4$ | Ti(OEH)$_4$ |
| 0 min | light yellow | light green | clear | light green | clear |

TABLE II-continued

Characteristic Colors of Diethyl Zinc-Titanium Complexes

| Time After Mixing | Ti(OEt)$_4$ | Ti(OnPr)$_4$ | Ti(OiPr)$_4$ | Ti(OnBu)$_4$ | Ti(OEH)$_4$ |
|---|---|---|---|---|---|
|  | emerald green | blue | | deep green | |
| 5 min | dark green | dark | clear | dark green | clear |
| 10 min | dark blue | dark green | clear | dark green | clear |
|  |  | very dark |  | very dark |  |
| 60 min | dark blue | very dark green | clear very light | very dark green | clear very light |
| 1 day | dark blue | very dark green | light blue | very dark green | light purple |
| 2 days | dark blue | very dark green | deep green | very dark green | purple |
| 7 days | blue | green | green | green | purple |

B. Preparation of the Catalyst Composition

The catalyst composition was prepared by adding with stirring under a nitrogen atmosphere to a 4-ounce (118.28 cc) serum bottle the following components in the following order:

| |
|---|
| 97.07 ml of Isopar® E |
| 0.93 ml of 0.64 M di-n-butyl magnesium |
| 0.80 ml of 0.94 M ethyl aluminum dichloride |
| 1.20 ml of 0.0125 M diethyl zinc-titanium complex |
| 100.0 ml |

The temperature of the serum bottles was maintained at ambient temperature (about 22° C.). Depending on the complex used, the catalyst was initially a bright yellow color. The catalyst then paled to a straw color over a period of 10 minutes, after which time there was no significant change in catalyst color.

C. Polymerization

A stirred batch reactor containing 2 liters of Isopar® E was heated to 150° C. The solvent vapor pressure was 21 psig. To this was added 6 psig of hydrogen and 173 psig of ethylene for a total reactor pressure of 200 psig. An amount of the above catalyst was injected into the reactor (10 ml=0.0015 mMoles Ti), and the reactor pressure was maintained constant at 200 psig with ethylene. The total reaction time was 20 minutes. The titanium species used and catalyst efficiencies are given in Table III.

COMPARATIVE EXPERIMENTS A-E

A. Preparation of the Catalyst Composition

Using the titanium stock solutions prepared above, the catalyst composition was prepared by adding, with stirring under a nitrogen atmosphere to a 4-ounce (118.28 cc) serum bottle, the following components in the following order:

| |
|---|
| 97.67 ml of Isopar® E |
| 0.93 ml of 0.64 M di-n-butyl magnesium |
| 0.80 ml of 0.94 M ethyl aluminum dichloride |
| 0.60 ml of 0.025 M titanium stock solution |
| 100.0 ml |

The catalyst was an initial straw color which darkened to a brownish color over a period of an hour. After this time, no further changes were detected.

B. Polymerization

Each of the catalysts were employed to polymerize ethylene using the conditions for Examples 1-5. The results are also shown in Table III.

COMPARATIVE EXPERIMENT F

A. Preparation of the Catalyst Composition

A catalyst composition was prepared where the diethyl zinc was not premixed with the titanium source, but rather was added directly to the catalyst. The catalyst composition was prepared by adding to a 4-ounce (118.28 cc) serum bottle the following components in the following order:

| |
|---|
| 97.07 ml of Isopar® E |
| 0.93 ml of 0.64 M di-n-butyl magnesium |
| 0.80 ml of 0.94 M ethyl aluminum dichloride |
| 0.60 ml of 0.025 M Ti(OiPr)$_4$ |
| 0.60 ml of 0.025 M diethyl zinc |
| 100.0 ml |

The catalyst was the same color as those prepared for comparative experiments A-E.

B. Polymerization

The catalyst was employed to polymerize ethylene using the conditions for Examples 1-5. The result is also shown in Table III.

TABLE III

Polymerization Results

| Example & Comp. Exp. Number | Titanium Species | Catalyst Efficiency Million #PE/#Ti | Exotherm[1] °C. |
|---|---|---|---|
| 1[2] | DEZ—Ti(OEt)$_4$ | 2.76 | 23° |
| 2[2] | DEZ—Ti(OnPr)$_4$ | 2.80 | 25° |
| 3[2] | DEZ—Ti(OiPr)$_4$ | 2.85 | 22° |
| 4[2] | DEZ—Ti(OnBu)$_4$ | 2.83 | 25° |
| 5[2] | DEZ—Ti(OEH)$_4$ | 2.89 | 22° |
| A | Ti(OEt)$_4$ | 2.35 | 18° |
| B | Ti(OnPr)$_4$ | 2.64 | 21° |
| C | Ti(OiPr)$_4$ | 2.30 | 13° |
| D | Ti(OnBu)$_4$ | 2.73 | 20° |
| E | Ti(OEH)$_4$ | 2.64 | 20° |

TABLE III-continued

Polymerization Results

| Example & Comp. Exp. Number | Titanium Species | Catalyst Efficiency Million #PE/#Ti | Exotherm[1] °C. |
|---|---|---|---|
| F[3] | DEZ—Ti(OiPr)$_4$ | 2.57 | 13° |

[1] Exotherm is the initial rise in reactor temperature from 150° C. when the catalyst is added to the reactor.
[2] DEZ and titanium compound premixed to form a complex or reactive product.
[3] DEZ and titanium compound added separately.

EXAMPLES 6–11

A. Preparation of Diethyl Zinc-Ti(OiPr)$_4$ Complexes

To 1.0 ml of neat Ti(OiPr)$_4$ was added varying amounts of 0.88 M diethyl zinc as indicated in Table IV. These mixtures were then diluted to 100.0 ml with Isopar ® E, giving a titanium concentration of 0.0336 M. Again, these solutions are stored in amber bottles to prevent photodecomposition.

B. Preparation of the Catalyst Compositions

Using the diethyl zinc-titanium solutions prepared above, the catalyst composition was prepared by adding, with stirring under a nitrogen atmosphere to a 4-ounce (118.25 cc) serum bottle, the following components in the following order:

```
97.95 ml of Isopar ® E
 0.80 ml of 0.745 M di-n-hexyl magnesium
 0.80 ml of 0.94 M ethyl aluminum dichloride
 0.45 ml of 0.0336 M diethyl zinc-titanium mixture
100.0 ml
```

TABLE IV

Ratios for DEZ—Ti(OiPr)$_4$ Complex Solutions

| Example & Comp. Exp. Number | ml DEZ | ml Ti(OiPr)$_4$ | Ratio Zn:Ti | Color Initially | Color after 1 day |
|---|---|---|---|---|---|
| 6 | 3.82 | 1.00 | 1:1 | dark green | dark green |
| 7 | 1.91 | 1.00 | ½:1 | dark purple | dark purple |
| 8 | 0.96 | 1.00 | ¼:1 | light purple | purple |
| 9 | 0.48 | 1.00 | ⅛:1 | light yellow | light purple |
| 10 | 0.24 | 1.00 | 1/16:1 | clear | very light purple |
| 11 | 0.12 | 1.00 | 1/32:1 | clear | clear |
| G | 0 | 1.00 | 0:1 | clear | clear |

C. Polymerizations

Each of the catalysts were employed to polymerize ethylene using the conditions for Examples 1–5. The results are shown in Table V.

COMPARATIVE EXPERIMENT G

A. Preparation of the Catalyst Composition

A catalyst was prepared following the procedure given in Examples 6–11 above except that Ti(OiPr)$_4$ alone was used in place of the diethyl zinc-Ti(OiPr)$_4$ complex. The catalyst color was similar to that of other catalysts—a straw brown in color.

B. Polymerization

The comparative catalyst was employed to polymerize ethylene using the conditions for Examples 1–5. The result is shown in Table V.

TABLE V

Polymerization Results

| Example & Comp. Exp. Number | Ratio Zn:Ti | Catalyst Efficiency Million #PE/#Ti | Exotherm[1] °C. |
|---|---|---|---|
| 6 | 1:1 | 3.28 | 14° |
| 7 | ½:1 | 3.34 | 16° |
| 8 | ¼:1 | 3.32 | 13° |
| 9 | ⅛:1 | 2.93 | 12° |
| 10 | 1/16:1 | 3.02 | 13° |
| 11 | 1/32:1 | 2.62 | 10° |
| G | 0:1 | 2.71 | 9° |

[1] Exotherm is the initial rise in reactor temperature from 150° C. when the catalyst is added to the reactor.

I claim:

1. The catalytic reaction product of
   (A) the reaction product or complex formed from the admixture of
      (1) at least one transition metal compound represented by the formulae $Tm(OR)_y X_{x-y}$ or $Tm(OR)_x \cdot _{t2}O$ wherein Tm is a transition metal selected from groups IVB, VB or VIB; each R is independently a hydrocarbyl group, having from 1 to about 20 carbon atoms; each X is independently a halogen; x has a value equal to the valence of Tm and y has a value from 1 to the valence of Tm; and
      (2) at least one zinc compound represented by the formulae $R_2Zn$ and $RZnX$ wherein each R is independently a hydrocarbyl group having from 1 to about 20 carbon atoms and X is a halogen; and
   (B) a magnesium halide resulting from the reaction of
      (1) an organomagnesium compound represented by the formula $MgR''_2 \cdot xMR''_y$ wherein M is aluminum or zinc, each R'' is independently a hydrocarbyl or hydrocarbyloxy group having from 1 to about 20 carbon atoms, x has a value from zero to 10 and y has a value corresponding to the valence of M; with
      (2) a halide source selected from
         (a) an active non-metallic halide, said non-metallic halide corresponding to the formula R'X wherein R' is hydrogen or a hydrocarbyl group such that the hydrocarbyl halide is at least as active as sec-butyl chloride and does not poison the catalyst and X is halogen or
         (b) a metallic halide corresponding to the formula $MR_{y-a}X_a$ wherein M is a metal of Group IIB, and IIIA or IVA of Mendeleev's Periodic Table of Elements, R is a monovalent hydrocarbyl radical, X is halogen, y is a number corresponding to the valence of M and a is a number of 1 to y; and
   (C) when the organomagnesium component and/or the halide source provides insufficient quantities of aluminum, an aluminum compound represented by the formula $AlR_{y'}X_{y''}$ wherein R and X are as defined above and y' and y'' each have a value of from zero to three with the sum of y' and y'' being three; and
wherein the components are employed in quantities which provide an atomic ratio of the elements Mg:Tm of from about 1:1 to about 2000:1; Zn:Tm at least about 0.03:1; Al:Tm of from about 0.1:1 to about 2000:1 and an excess X:Al of from about 0.0005:1 to about 10:1.

2. The catalytic reaction product of claim 1 wherein (a) in component (A-1), Tm is titanium, each R is independently a hydrocarbyl group having from 1 to about 10 carbon atoms and X is chlorine or bromine; (b) in component (A-2), the zinc compound is represented by the formula $ZnR_2$ wherein R is a hydrocarbyl group having from 1 to about 10 carbon atoms; (c) in component (B-1), M is aluminum and R″ is a hydrocarbyl group having from 1 to about 10 carbon atoms and x has a value of from about 0.001 to about 5; (d) in component (B-2-a), R′ is hydrogen or a tertiary butyl group and X is chlorine; (e) in component (B-2-b), M is a metal from Groups IIIA or IVA, y-a is zero or 1 and X is chlorine; (f) in component (C), the aluminum compound is a trialkyl aluminum compound wherein the alkyl groups independently have from 1 to about 10 carbon atoms; and (g) the components are employed in quantities so as to provide atomic ratios of Mg:Ti of from about 2:1 to about 200:1; Zn:Ti from about 0.12:1 to about 5:1; Al:Ti of from about 0.5:1 to about 200:1 and excess X:Al of from about 0.002:1 to about 2:1.

3. The catalytic reaction product of claim 2 wherein (a) in component (A-1), R is a saturated aliphatic hydrocarbyl group; (b) in component (B-1), x has a value of from about 0.15 to about 2.5; and (c) the components are employed in quantities so as to provide atomic ratios of Mg:Ti of from about 5:1 to about 75:1; Zn:Ti of from about 2:1 and excess X:Al of from about 0.01:1 to about 1.4:1.

4. The catalytic reaction product of claim 3, wherein (a) component (A-1) is titanium tetraethoxide, titaniumm tetra-n-propoxide, titanium tetra-isopropoxide, titanium tetra-n-butoxide, or titanium tetra-(2-ethylhexoxide); (b) component (A-2) is dimethyl zinc, diethyl zinc or diphenyl zinc; (c) component (B-1) is a dialkyl magnesium compound wherein the alkyl groups independently have from 1 to about 10 carbon atoms; and (d) component (B-2) is substantially anhydrous hydrogen chloride, ethyl aluminum dichloride or tin tetrachloride.

5. The catalytic reaction product of claims 1, 2, 3 or 4 wherein the components are added in the order (B-1), (B-2), (C) if employed and (A).

6. The catalytic reaction product of claims 1, 2, 3 or 4 wherein the components are added in the order (B-1), (B-2), (A) and (C) if employed, and provided that the halide source, (B-2), is not a tin compound.

7. In a catalyst composition comprising a magnesium halide, a transition metal compound and a zinc compound, said composition having an atomic ratio of the elements Mg:Tm of from about 1:1 to about 2000:1; Zn:Tm at least about 0.03:1 Al:Tm of from about 0.1:1 to about 2000:1 and an excess X:Al of from about 0.0005:1 to about 10:1; the improvement which comprises forming a reaction product or complex of the transition metal compound and the zinc compound prior to preparation of the catalyst therefrom.

8. The catalyst composition of claim 7 wherein the atomic ratios of the elements are Mg:Tm of from about 2:1 to about 200:1; Zn:Tm of from about 0.12:1 to about 5:1; Al:Tm of from about 0.5:1 to about 200:1 and excess X:Al of from about 0.002:1 to about 2:1.

9. The catalyst composition of claim 7 wherein the atomic ratios of the elements are Mg:Tm of from about 5:1 to about 75:1; Zn:Tm of from about 0.25:1 to about 2:1; Al:Tm of from about 1:1 to about 75:1 and excess X:Al of from about 0.01:1 to about 1.4:1.

* * * * *

UNITED STATES PATENT AND TRADEMARK OFFICE
CERTIFICATE OF CORRECTION

PATENT NO. : 4,269,733
DATED : May 26, 1981
INVENTOR(S) : Randall S. Shipley

It is certified that error appears in the above-identified patent and that said Letters Patent are hereby corrected as shown below:

Column 1, line 55 change "efficiences" to --efficiencies--.

Column 2, line 47 change "(c)" to --(C)--.

Column 2, line 56 change "0.1" to --0.1:1--.

Column 3, line 50 change "arly" to --aryl--.

Column 4, line 19 change "diiospropyl" to --diisopropyl--.

Column 4, line 21 change "magesium" to --magnesium--.

Column 4, line 49 change "choride" to --chloride--.

Column 4, line 59 change "Y" to --y--.

Column 6, line 27 change "free" to --freed--.

Column 7, line 10 change "and" to --the--.

Column 7, line 18 change "100" to --1000--.

Column 11, line 26 change "(118.25cc)" to --(118.28cc)--.

Column 12, line 21, claim 1 change "$Tm(OR)x(_2 0$" to --$Tm(OR)_{x-2} 0$--.

Column 12, line 50 Claim 1 delete "and".

Column 13, line 26 between "about" and "2:1" add --0.25:1 to about--.

Column 13, line 28 delete "," after 3.

UNITED STATES PATENT AND TRADEMARK OFFICE
CERTIFICATE OF CORRECTION

PATENT NO. : 4,269,733
DATED : May 26, 1981
INVENTOR(S) : Randall S. Shipley

It is certified that error appears in the above-identified patent and that said Letters Patent are hereby corrected as shown below:

Column 13, line 30 change "umm" to --um--.

Signed and Sealed this

Thirteenth Day of October 1981

[SEAL]

Attest:

GERALD J. MOSSINGHOFF

Attesting Officer

Commissioner of Patents and Trademarks